United States Patent
Morita et al.

(10) Patent No.: US 7,997,068 B2
(45) Date of Patent: Aug. 16, 2011

(54) SULFUR PURGE CONTROL DEVICE FOR AN INTERNAL COMBUSTION ENGINE

(75) Inventors: Tomoko Morita, Wako (JP); Norio Suzuki, Wako (JP); Hiroshi Ohno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 702 days.

(21) Appl. No.: 12/044,582

(22) Filed: Mar. 7, 2008

(65) Prior Publication Data

US 2008/0216466 A1  Sep. 11, 2008

(30) Foreign Application Priority Data

Mar. 8, 2007 (JP) .................................. 2007-058336

(51) Int. Cl.
*F01N 3/00* (2006.01)

(52) U.S. Cl. ............... 60/286; 60/276; 60/295; 60/297; 60/301

(58) Field of Classification Search .................. 60/274, 60/276, 278, 280, 285, 286, 295, 297, 301
See application file for complete search history.

(56) References Cited

U.S. PATENT DOCUMENTS

| | | | | |
|---|---|---|---|---|
| 5,832,722 A | * | 11/1998 | Cullen et al. | 60/274 |
| 6,199,372 B1 | * | 3/2001 | Wakamoto | 60/274 |
| 6,438,945 B1 | * | 8/2002 | Takagi et al. | 60/283 |
| 6,962,045 B2 | * | 11/2005 | Kitahara et al. | 60/295 |
| 7,051,520 B2 | * | 5/2006 | Nagaoka et al. | 60/297 |
| 7,191,590 B2 | * | 3/2007 | Nagaoka et al. | 60/285 |
| 7,707,826 B2 | * | 5/2010 | Wang et al. | 60/295 |

FOREIGN PATENT DOCUMENTS

| | | |
|---|---|---|
| JP | 62-114657 A | 5/1987 |
| JP | 11-347369 A | 12/1999 |
| JP | 2000-110552 A | 4/2000 |
| JP | 2000-230421 A | 8/2000 |
| JP | 2001-003782 A | 1/2001 |
| JP | 2001-173498 A | 6/2001 |
| JP | 2005-155374 A | 6/2005 |
| JP | 2005-337029 A | 12/2005 |
| JP | 2006-207487 A | 8/2006 |
| JP | 2007-23807 A | 2/2007 |

* cited by examiner

*Primary Examiner* — Binh Q. Tran
(74) *Attorney, Agent, or Firm* — Arent Fox LLP

(57) ABSTRACT

In a control device for an internal combustion engine provided with a NOx catalytic converter in an exhaust passage thereof, the progress of an undesired substance removal process is computed from the consumption of the reducing agent contained in the exhaust gas in the NOx catalytic converter. The undesired substance may include sulfur contents and NOx captured in the NOx catalytic converter. This computation may be based on the air fuel ratio of the exhaust gas upstream of the NOx catalytic converter and the estimated consumption of the reducing agent contained in the exhaust gas or on the difference between the air fuel ratios of the exhaust gas upstream and downstream of the NOx catalytic converter. In either case, the accuracy can be improved by taking into account the space velocity of the exhaust gas.

19 Claims, 7 Drawing Sheets

SULFUR PURGE CONTROL DEVICE FOR AN INTERNAL COMBUSTION ENGINE

TECHNICAL FIELD

The present invention relates to a control device and method for an internal combustion engine, and in particular to a control device and method for an internal combustion engine which are configured to execute a process of removing undesired substances such as sulfur contents and captured nitrogen oxides from a catalytic converter for eliminating nitrogen oxides from exhaust gas.

BACKGROUND OF THE INVENTION

The exhaust passage of a diesel engine is sometimes fitted with a lean NOx catalytic converter (referred to as LNC hereinafter) for reducing and eliminating nitrogen oxides (referred to as NOx hereinafter) from the exhaust gas. In an LNC, NOx is absorbed when the air fuel ratio of the exhaust gas (referred to exhaust A/F hereinafter) is higher than a prescribed level (referred to as a lean condition hereinafter) or when the oxygen content of the exhaust gas is high, and the absorbed NOx is released and reduced to a harmless form when the exhaust A/F is lower than the prescribed level (referred to as a rich condition hereinafter) or when the oxygen content of the exhaust gas is low. Because the capability of the LNC to absorb NOx diminishes as the build up of the NOx therein increases, the combustion state may be varied so that the concentration of the reducing agents such as CO and HC is increased while the oxygen concentration is decreased. Thereby, the release of NOx from the LNC is enhanced, and the reduction of the NOx is promoted.

Because the fuel includes sulfur contents, sulfur oxides (referred to as SOx hereinafter) and hydrogen sulfide (referred to as $H_2S$ hereinafter) are also emitted with the exhaust gas. When such sulfur contents are absorbed by the LNC, the capability of the LNC to absorb NOx diminishes. Therefore, it is necessary to release the sulfur contents absorbed in the LNC from time to time. The process of releasing sulfur contents from a LNC (referred to as sulfur purging hereinafter) is typically executed by enriching the exhaust A/F and causing the LNC temperature to rise by carrying out an auxiliary fuel injection following the combustion (referred to as post injection hereinafter) in addition to the main fuel injection that is carried out during the intake stroke and thereby supplying unburned fuel to the exhaust passage and heating the LNC beyond a prescribed temperature (see Japanese patent laid open publication Number 2001-173498).

As a sulfur purging adversely affects the fuel economy and causes a thermal degradation of the LNC, it is not desirable to conduct a sulfur purging to an excessive extent. Therefore, it is desired to accurately determine the completion of a sulfur purging process. It is known to estimate the accumulation of SOx from fuel consumption and estimate the expected extent of the release of SOx during a sulfur purging process. Once the estimated extent of the release of SOx reaches a prescribed level, the sulfur purging process is terminated. See Japanese patent laid open publication Number 2000-110552. It is also known to provide a SOx sensor at each of the inlet and outlet of the LNC and terminate the sulfur purging process when the accumulated amount of SOx in the LNC falls below a prescribed level. See Japanese patent laid open publication Number 2001-003782.

However, as the method described in Japanese patent laid open publication Number 2000-110552 is based on estimation, it is possible that the sulfur purging may be terminated prematurely or that the sulfur purging may be uselessly continued long after the sulfur purging is complete.

The method described in Japanese patent laid open publication Number 2001-003782 may allow the completion of sulfur purging at a high precision, but because a plurality of sensors must be arranged one next to the other, there may be a problem in securing an adequate mounting space, and the manufacturing cost may be undesirably high.

BRIEF SUMMARY OF THE INVENTION

In view of such problems of the prior art, a primary object of the present invention is to provide a control device for an internal combustion engine that can accurately execute an undesired substance removal process of a LNC without requiring a complicated structure or increasing the manufacturing cost.

A second object of the present invention is to provide a control method that allows an undesired substance removal process of a LNC to be carried out without requiring a complicated structure or increasing the manufacturing cost.

To achieve such objects, the present invention provides a control device for an internal combustion engine provided with a NOx catalytic converter in an exhaust passage thereof, comprising: a control unit that estimates an extent of deposition of undesired substance in the NOx catalytic converter and changes operating parameters of the engine so as to produce a reducing agent in the exhaust gas and thereby carry out a removal process of the undesired substance from the NOx catalytic converter; and an upstream detector for detecting a value corresponding to an air fuel ratio in an upstream part of the NOx catalytic converter; wherein the control unit determines an end of the undesired substance removal process according to an output value of the upstream detector. The undesired substance may comprise a sulfur compound accumulated in the catalytic converter and NOx captured by the catalytic converter among other possibilities.

Also, the present invention provides a method for use in conjunction with an internal combustion engine provided with a NOx catalytic converter in an exhaust passage thereof, the method being designed for controlling a removal process of undesired substance in the NOx catalytic converter, and comprising: estimating an extent of deposition of undesired substance in the NOx catalytic converter; changing operating parameters of the engine from normal values so as to produce a reducing agent from the exhaust gas in the exhaust passage and thereby carry out an undesired substance removal process in the NOx catalytic converter; detecting an upstream air fuel ratio value corresponding to an air fuel ratio in an upstream part of the NOx catalytic converter; and ending the undesired substance removal process according to the detected upstream air fuel ratio value.

Thus, according to the present invention, by monitoring the extent of deposition of undesired substance in the NOx catalytic converter and computing the amount of the reducing agent required for the removal process of the undesired substance from the NOx catalytic converter, the time duration of the undesired substance removal process can be optimized even when the extent of undesired substance deposition varies and/or even when any deliberate undesired substance removal process is not being executed (under a natural undesired substance removal process enabling condition). Also, because there is no need for a sensor for detecting the undesired substance itself, there is no such problems as an increased manufacturing cost and the need for a significant mounting space.

The progress of the undesired substance removal process can be monitored either by integrating a difference between the upstream air fuel ratio value and a prescribed reference value or a difference between the detected upstream and downstream air fuel ratio values. "Integrating" as used herein includes all kinds of adding up or accumulating values over time as well as the mathematical process of integration.

When the progress of the undesired substance removal process is monitored by integrating a difference between the upstream air fuel ratio value and a prescribed reference value, it is desirable to take into account the CO consumption ratio because the performance of CO varies depending on various parameters such as the temperature in the LNC. Also, in either case, the space velocity of the exhaust gas that enters the NOx catalytic converter has a direct influence on the progress of the undesired substance removal process, it is desirable to take into account the detected space velocity in determining an end of the undesired substance removal process.

In short, according to the present invention, in a control device or method for an internal combustion engine provided with a NOx catalytic converter in an exhaust passage thereof, the progress of the undesired substance removal process is computed from the consumption of a reducing agent contained in the exhaust gas in the NOx catalytic converter. This computation may be based on the air fuel ratio of the exhaust gas upstream of the NOx catalytic converter and the estimated consumption of the reducing agent contained in the exhaust gas or on the difference between the air fuel ratios of the exhaust gas upstream and downstream of the NOx catalytic converter. In either case, the accuracy can be improved by taking into account the space velocity of the exhaust gas.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
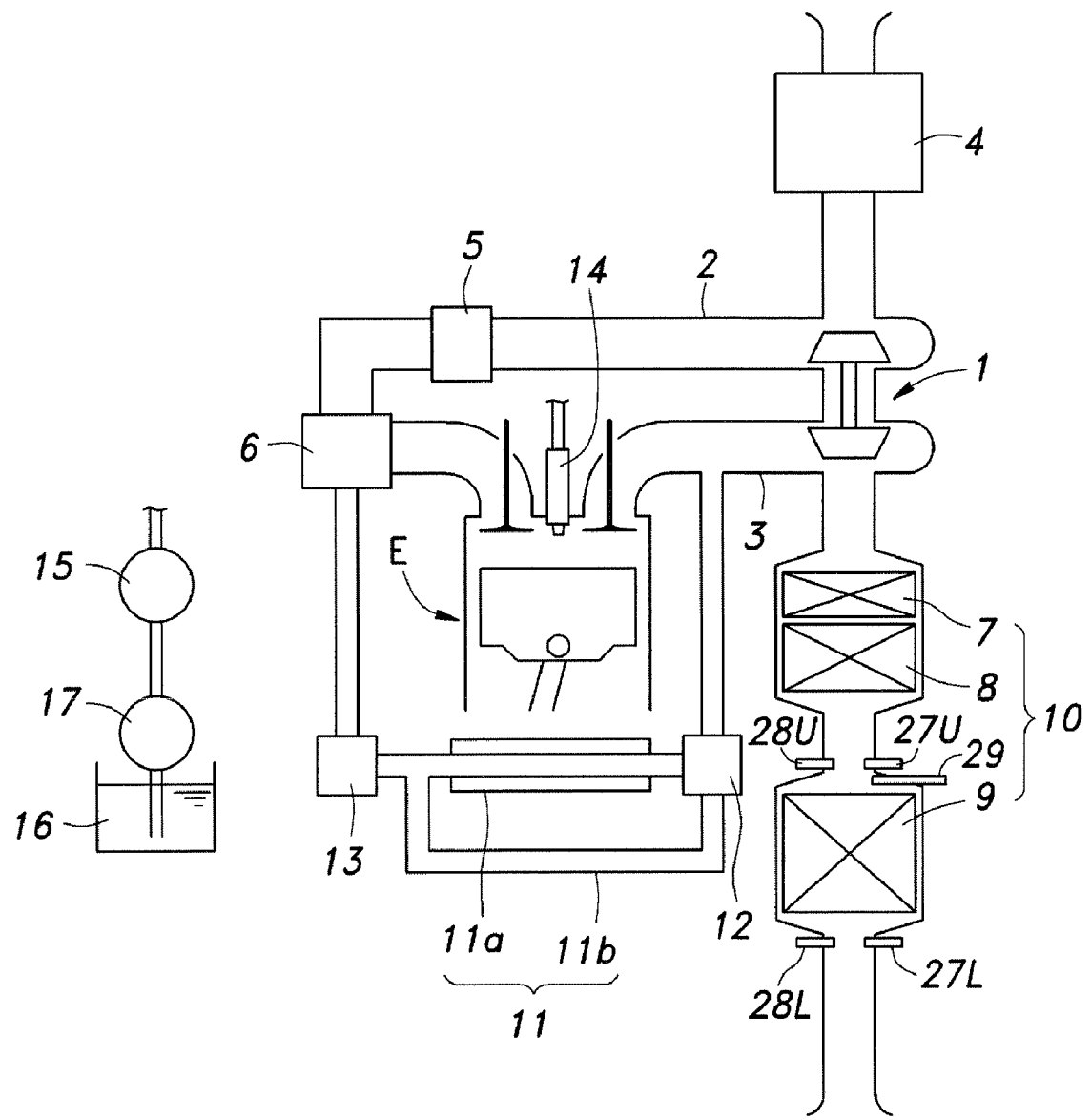
FIG. 1 is an overall structural view of an internal combustion engine to which the present invention is applied.

FIG. 1 is a view showing the basic structure of an internal combustion engine E to which the present invention is applied. This engine (diesel engine) E is not different from conventional engines as far as the mechanical structure is concerned, and is provided with a turbocharger 1 equipped with a variable boost pressure mechanism. An intake passage 2 is connected to a compressor end of the turbocharger 1, and an exhaust passage 3 is connected to a turbine end of the turbocharger 1. An air cleaner 4 is connected to the upstream end of the intake passage 2, and in appropriate parts of the intake passage 2 are provided an intake control valve 5 for controlling the flow rate of the fresh air that flows into a combustion chamber and a swirl control valve 6 for increasing the flow speed of the intake flow by restricting the cross sectional area of the passage under a low speed, partial load condition. To the downstream end of the exhaust passage 3 is connected an exhaust cleaning system 10 comprising a diesel oxidation catalytic converter (DOC) 7, a diesel particulate filter (DPF) 8 for removing particulate substances such as soot and a lean NOx catalytic converter (LNC) 9 discussed above that are connected in that order.

The swirl control valve 6 and a part of the exhaust passage 3 immediately downstream of the combustion chamber are connected to each other via an exhaust gas recirculating (EGR) passage 11. The EGR passage 11 comprises a cooler passage 11a and a bypass passage 11b that bifurcate at a switching valve 12 (provided at an exhaust end thereof) and merge at an EGR control valve 13 (provided at an intake end thereof) for controlling the amount of EGR gas that flows into the combustion chamber.

The cylinder head of the internal combustion engine E is provided with a fuel injection valve 14 having a free end projecting into the combustion chamber. This fuel injection valve 14 is connected to a common rail 15 which is in turn connected to a fuel pump 17 and receives fuel at a prescribed high pressure. The fuel pump 17 is actuated by the crankshaft and draws fuel from a fuel tank 16.

Figure 2:
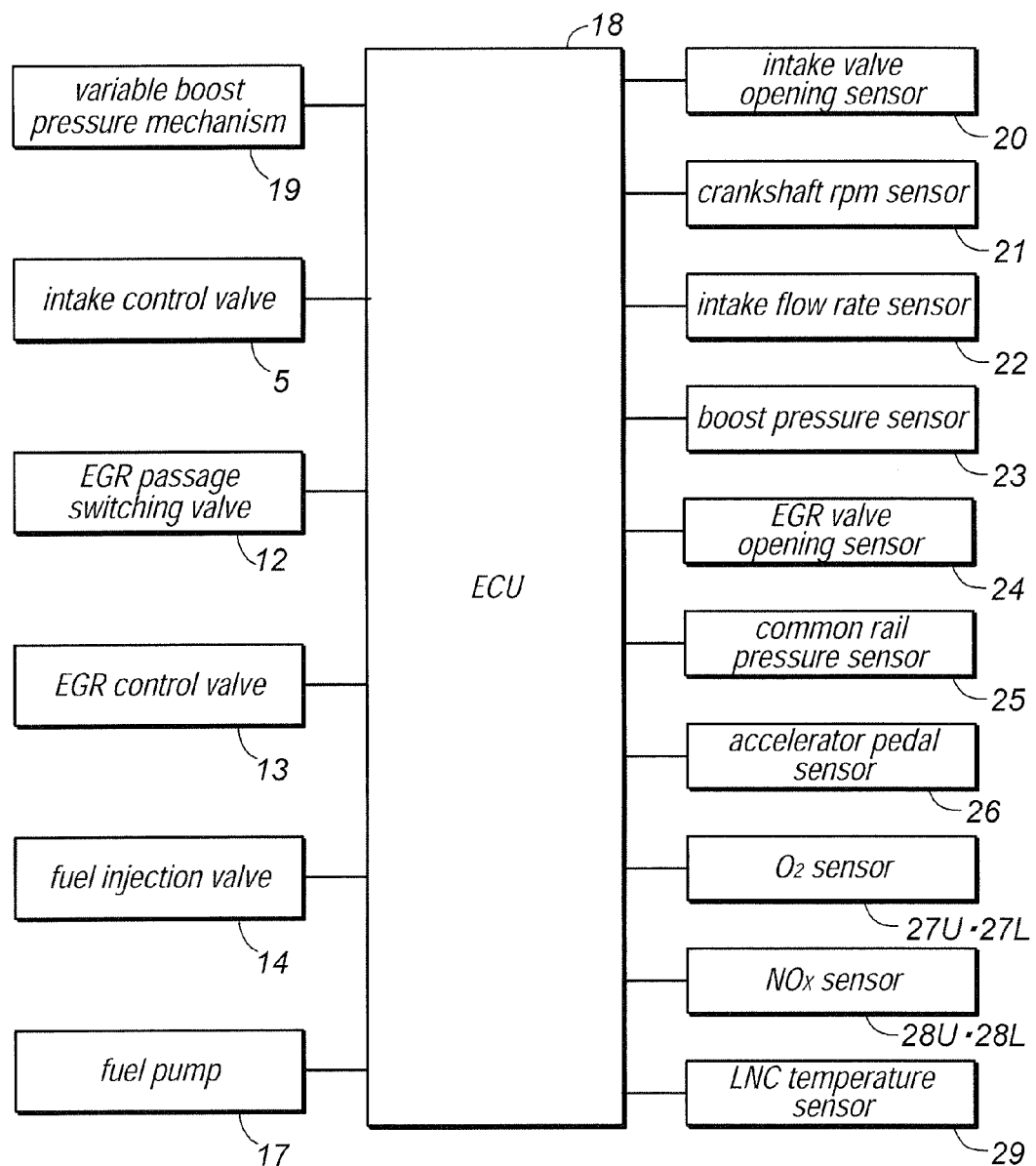
FIG. 2 is a block diagram of the control unit according to the present invention.

The variable boost pressure mechanism 19, intake control valve 5, EGR passage switching valve 12, EGR control valve 13, fuel injection valve 14, fuel pump 17 and so on are configured to operate according to control signals forwarded from an electronic control unit (ECU) 18 (see FIG. 2).

The ECU 18 in turn receives output signals from an intake valve opening sensor 20, crankshaft rotational speed sensor 21, intake flow rate sensor 22, boost pressure sensor 23, EGR valve opening sensor 24, common rail pressure sensor 25, accelerator pedal sensor 26, $O_2$ sensors 27U and 27L, NOx sensors 28U and 28L, LNC temperature sensor 29 and so on that are provided in appropriate parts of the engine E.

The memory of the ECU 18 stores maps for the target values of various control objects including an optimum fuel injection for each given crankshaft rotational speed and torque demand (accelerator pedal displacement) which is typically determined experimentally so that the various control objects may be optimally controlled and an optimum combustion state may be achieved under all load conditions of the internal combustion engine E.

First Embodiment

The control flow relating to the sulfur purge action according to a first embodiment of the present invention is described in the following with reference to FIG. 3.

First of all, the extent of sulfur poisoning of the LNC 9 is estimated, and the corresponding amount of a reducing agent required for the sulfur purging is computed (step 1).

Figure 4:
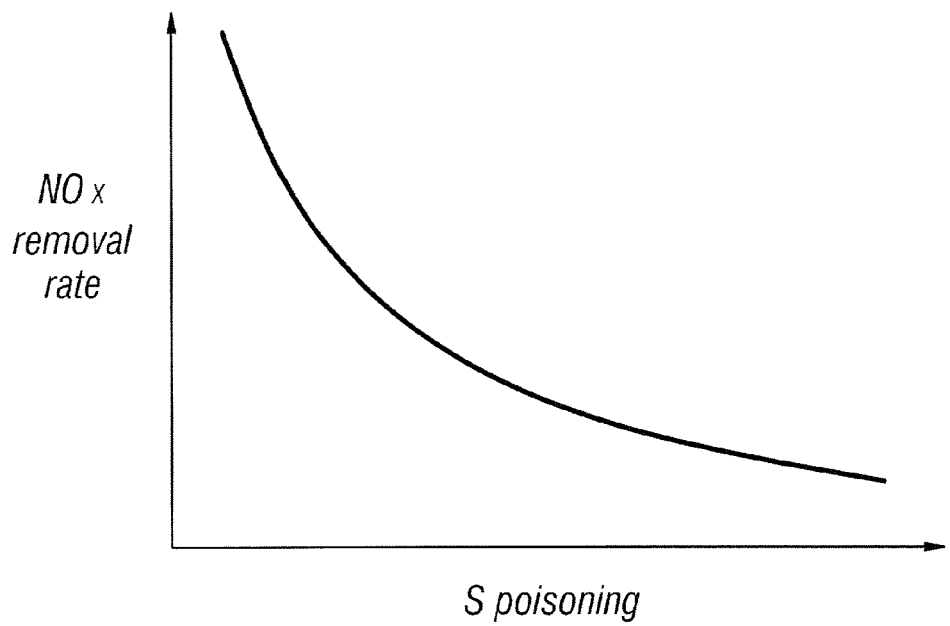
FIG. 4 is a graph showing the relationship between the extent of sulfur poisoning and NOx removal ratio.
Figure 5:
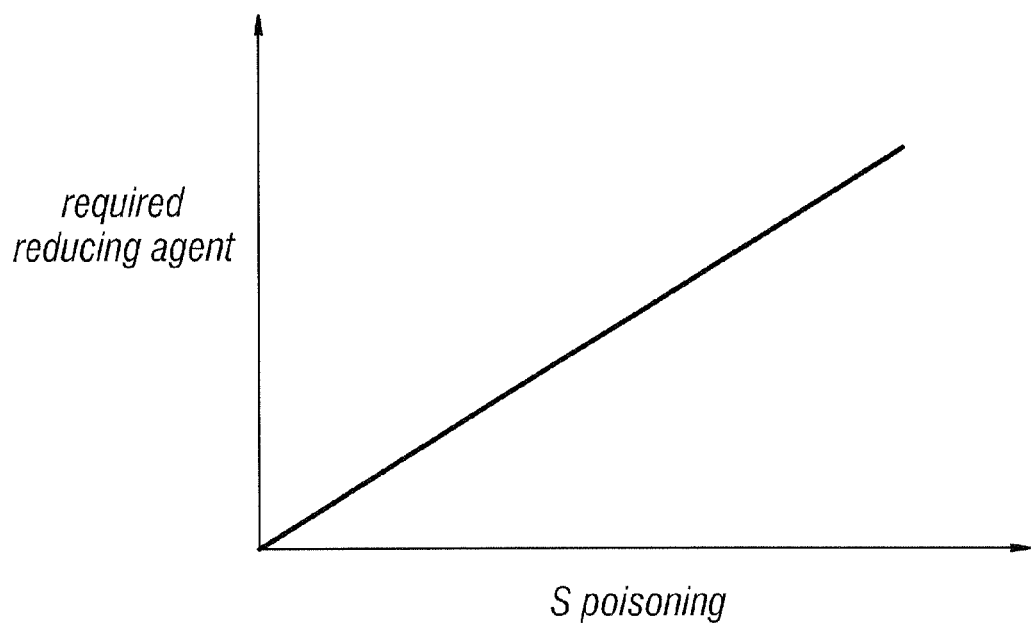
FIG. 5 is a graph showing the relationship between the extent of sulfur poisoning and the required amount of a reducing agent for the sulfur purging.

The extent of sulfur poisoning is inversely proportional to the NOx removal rate in the LNC 9 as shown in FIG. 4. In other words, the higher the NOx removal rate is, the lower the extent of sulfur poisoning is, and the NOx removal rate diminishes as the extent of sulfur poisoning advances. Therefore, it is possible to estimate the extent of sulfur poisoning from the level of the NOx removal rate. The NOx removal rate can be computed from the ratio of the outputs of the two NOx sensors 28U and 28L provided at the upstream end (inlet) and downstream end (outlet) of the LNC 9, respectively. As the amount of the reducing agent that is required for the sulfur purging is proportional to the extent of sulfur poisoning (FIG. 5), the required amount of the reducing agent can be readily computed from the extent of sulfur poisoning. The extent of sulfur poisoning of the LNC 9 can also be estimated from the driving mileage, driving time period and fuel consumption.

It is then determined if the estimated extent of sulfur poisoning has exceeded a prescribed level (step 2). If the estimated extent of sulfur poisoning has exceeded the prescribed level, a sulfur purge is executed, and it is determined if the temperature of the LNC 9 is high enough to enable a sulfur purge from the output value of the LNC temperature sensor 29 provided upstream of the LNC 9 (step 3). If the output value of the LNC temperature sensor 29 is below a prescribed level (650° C., for instance), a temperature increase control is executed (step 4).

The temperature increase control consists of a feedback control for maintaining the LNC temperature at a level suitable for a sulfur purge by suitably combining the delaying of the main injection timing, increasing the post injection and reducing the intake air.

If the temperature of the LNC 9 is high enough for a sulfur purge, an exhaust A/F enriching control for a sulfur purge is executed (step 5). This exhaust A/F enriching control is essentially similar to the temperature increase control, but involves a further increase in the post injection and a further reduction in the intake air as compared with the temperature increase control.

If the LNC 9 is under a rich condition suitable for a sulfur purge, the output signal of the upstream $O_2$ sensor 27U provided at the upstream end of the LNC 9 is monitored, and the amount of the reducing agent that has been supplied to the LNC 9 is estimated according to an integrated value of the difference between the output of the upstream $O_2$ sensor 27U and a prescribed reference value (corresponding to a stoichiometric condition) (step 6). The consumption of the reducing agent in the LNC 9 is then computed from the estimated amount of the reducing agent that has been supplied (step 7). Alternatively, the consumption of the reducing agent in the LNC 9 may be estimated from an integrated value of the difference between the outputs of the upstream $O_2$ sensor 27U and downstream $O_2$ sensor 27L (step 8). In either case, the integrated value is monitored and compared with the required amount of the reducing agent obtained in step 1 (step 9), and a sulfur purge end signal is produced when the integrated value has reached the required amount of the reducing agent (step 10).

More specifically, as the exhaust A/F ratio can be determined from the oxygen concentration in the exhaust gas, the amount of the reducing agent that has been supplied to the LNC 9, hence the consumption of the reducing agent can be determined from an integrated value of the difference between the output of the upstream $O_2$ sensor 27U and a prescribed reference value (corresponding to a stoichiometric condition), or from the integrated value of the difference between the outputs of the upstream $O_2$ sensor 27U and downstream $O_2$ sensor 27L. Therefore, the amounts of the reducing agent that are supplied and consumed can be determined by monitoring the output of the upstream $O_2$ sensor or the outputs of the two $O_2$ sensor during the process of sulfur purging. In particular, if the amount of the reducing agent required for sulfur purging a catalytic converter that has incurred a certain extent of sulfur poisoning is determined in advance, the end of the process of sulfur purge can be determined as the time point at which the supply or consumption of the reducing agent has reached the required amount.

It is possible to determine the end of the process of sulfur purging from either of the two possible processes mentioned above, but the precision in the estimation can be improved by comparing the results obtained by the two different processes.

Figure 6:
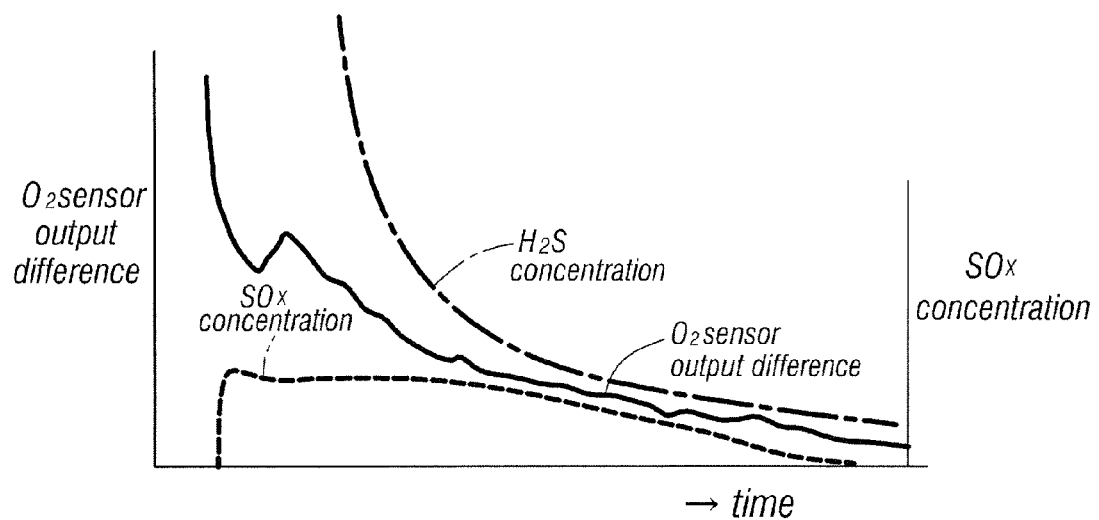
FIG. 6 is a graph showing the relationship between the difference of the outputs of the two $O_2$ sensors and sulfur concentration.

FIG. 6 shows the time history of the difference between the outputs of the two $O_2$ sensors 27U and 27L provided in the upstream and downstream ends of the LNC 9, respectively, and the sulfur concentrations during a sulfur purge process. The difference between the outputs of the two $O_2$ sensors 27U and 27L is significant in an early stage of the sulfur purging process, but, as the sulfur purging process progresses and the SOx concentration or $H_2S$ concentration diminishes, progressively diminishes. It means that the release of sulfur can be estimated from the difference between the outputs of the two $O_2$ sensors.

Because the amount of the supply of the reducing agent increases with an increase in the space velocity or an increase in the flow rate of the exhaust gas, when computing the amount of supply of the reducing agent, the accuracy can be improved by taking into account the space velocity SV so that the end of sulfur purging in the LNC can be determined more accurately. More specifically, the amount of supply of the reducing agent (extent of enriching A/F) can be determined from the exhaust A/F based on the difference between the output from the upstream $O_2$ sensor 27U and the prescribed reference value (corresponding to a stoichiometric condition), and the amount of supply is corrected by multiplying it with a correction coefficient kSV1 which can be looked up from a map giving this coefficient kSV1 as a mathematical function of the space velocity SV. This typically corrects the amount of supply to a higher value. In other words, the greater the space velocity is, the sooner the sulfur purge ends. Here, the space velocity SV is given as a ratio of the flow rate of the supplied reducing agent to the volume of the vessel or the relevant volume of the container:

$$\text{space velocity}(SV) = (\text{intake flow rate} + \text{fuel supply})/\text{volume of LNC}$$

where the intake flow rate can be given as an output of the intake flow rate sensor 22 and the fuel supply can be given as an estimated value based on a control value for the fuel injection valve 13 produced from the ECU in response to the output of the accelerator pedal sensor 26. The volume of the LNC can be measured in advance.

Figure 7:
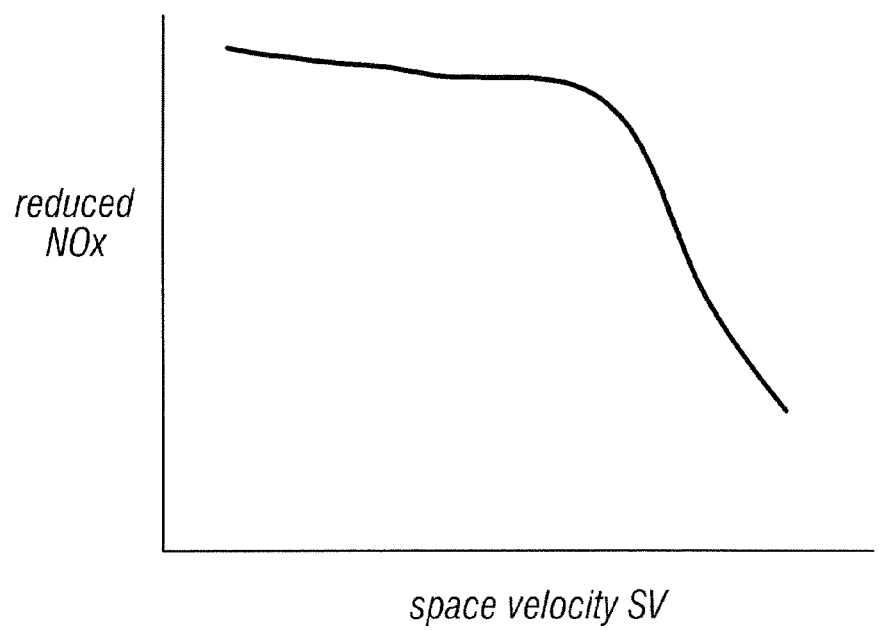
FIG. 7 is a graph showing the relationship between the space velocity SV and LNC temperature.

Meanwhile, as shown in FIG. 7, as the space velocity SV increases, the reducing agent does not have an adequate time to react before it passes through the LNC 9, and this means the NOx is reduced to a lesser extent. In other words, the consumption of the reducing agent in the LNC 9 diminishes. Therefore, by correcting the supply of the reducing agent estimated from the integrated value of the difference between the output of the upstream $O_2$ sensor 27U and the value corresponding to the stoichiometric condition in such a manner that the consumption of the reducing agent diminishes with an increase in the space velocity SV, the consumption of the reducing agent can be estimated more accurately. This correcting process may be performed, again, by looking up a map for the correction coefficient kSV2 in relation to the space velocity SV, and multiplying this coefficient so that the end of the sulfur purge may be delayed as the space velocity increases.

Figure 8:
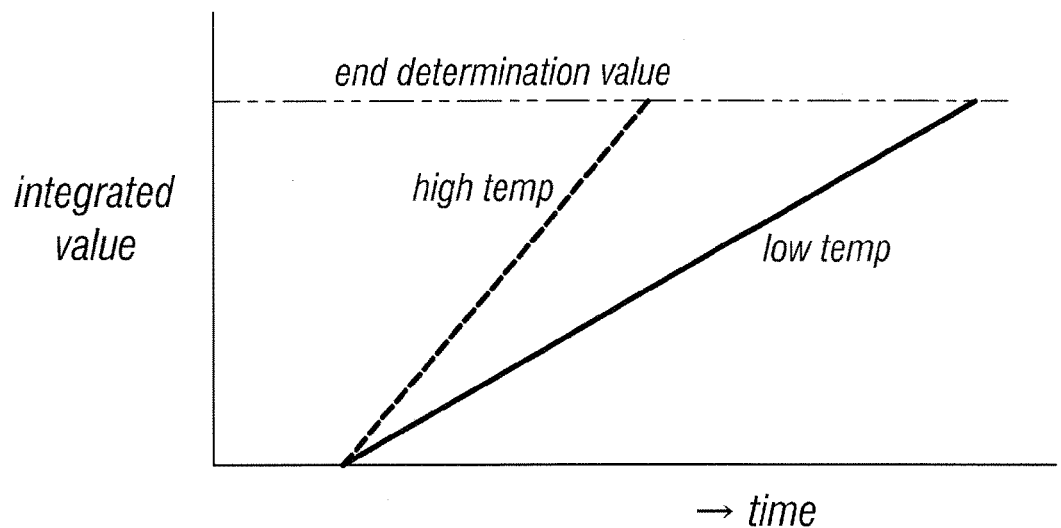
FIG. 8 is a graph showing the relationship between the sulfur purge speed and LNC temperature.
Figure 9:
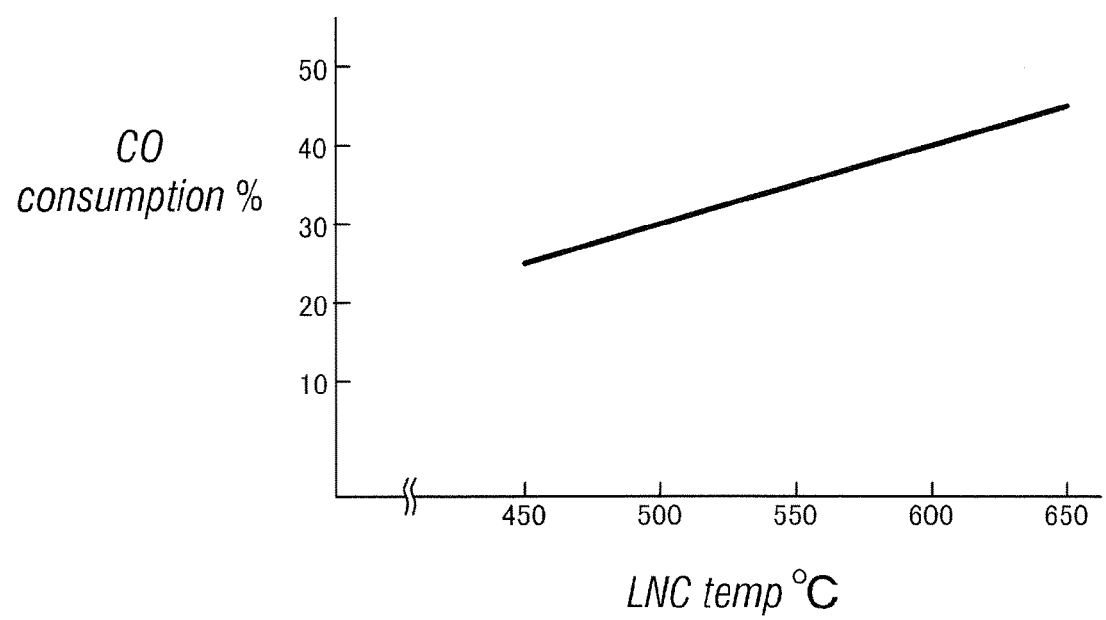
FIG. 9 is a graph showing the relationship between the CO consumption and LNC temperature.
Figure 10:
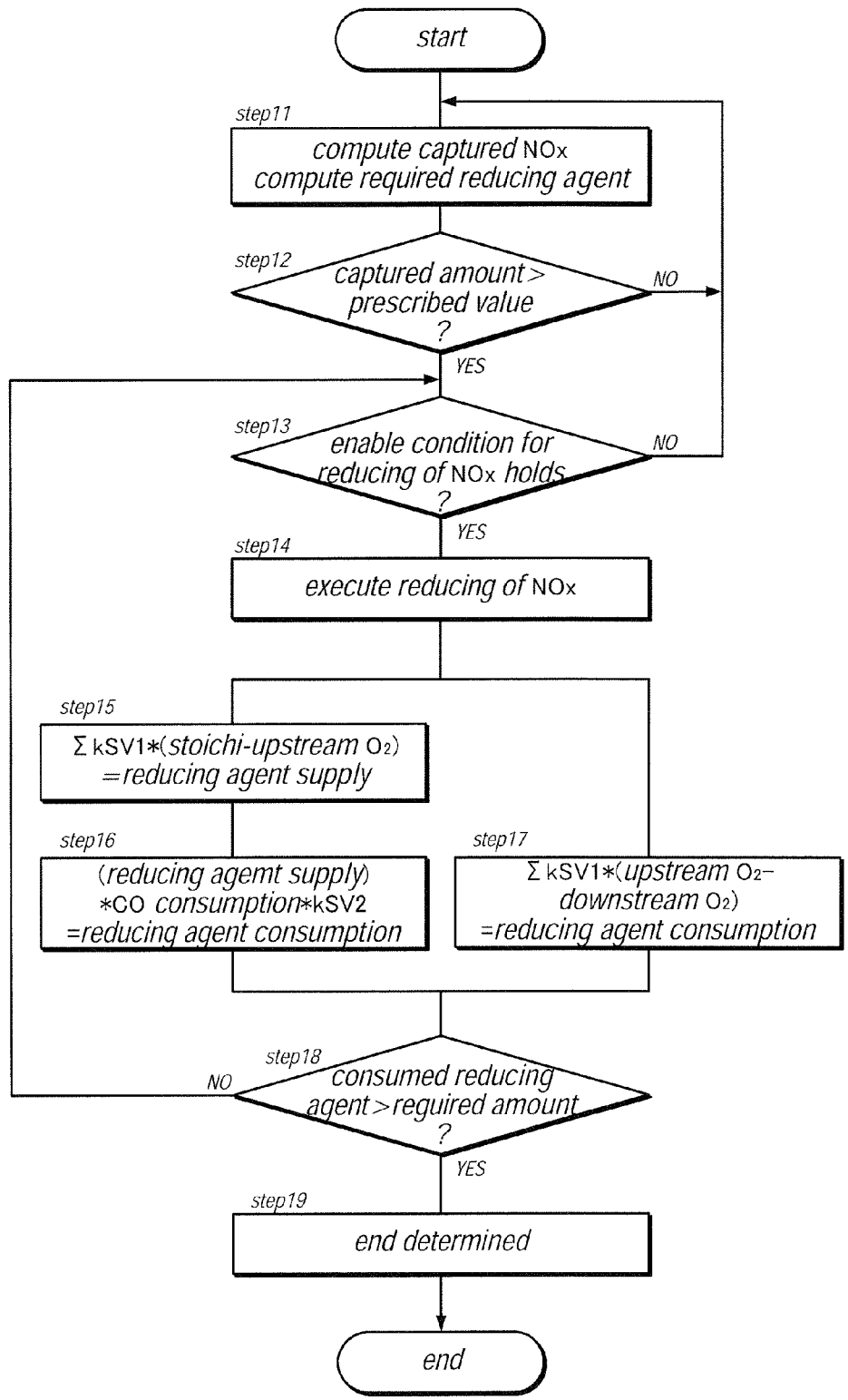
FIG. 10 is a control flowchart of the second embodiment of the present invention.

As shown in FIG. 8, the higher the temperature of the LNC 9 is, the less time is required for the sulfur purging processing thereof. It indicates that there is a certain relationship between the temperature of the LNC 9 and the consumption of the reducing agent. The dependence of the consumption of the reducing agent on the temperature of the LNC 9 agrees with the dependency of the consumption of CO on the temperature of the LNC 9 as shown in FIG. 9. Therefore, the consumption of the reducing agent can be more accurately estimated from the supply of the reducing agent by multiplying the consumption ratio of CO to the integrated value of the difference between the output of the upstream $O_2$ sensor and the value corresponding to the stochiometric condition, and judging the reducing agent consumption from the multiplied value, instead of judging it only from the integrated value.

Figure 3:
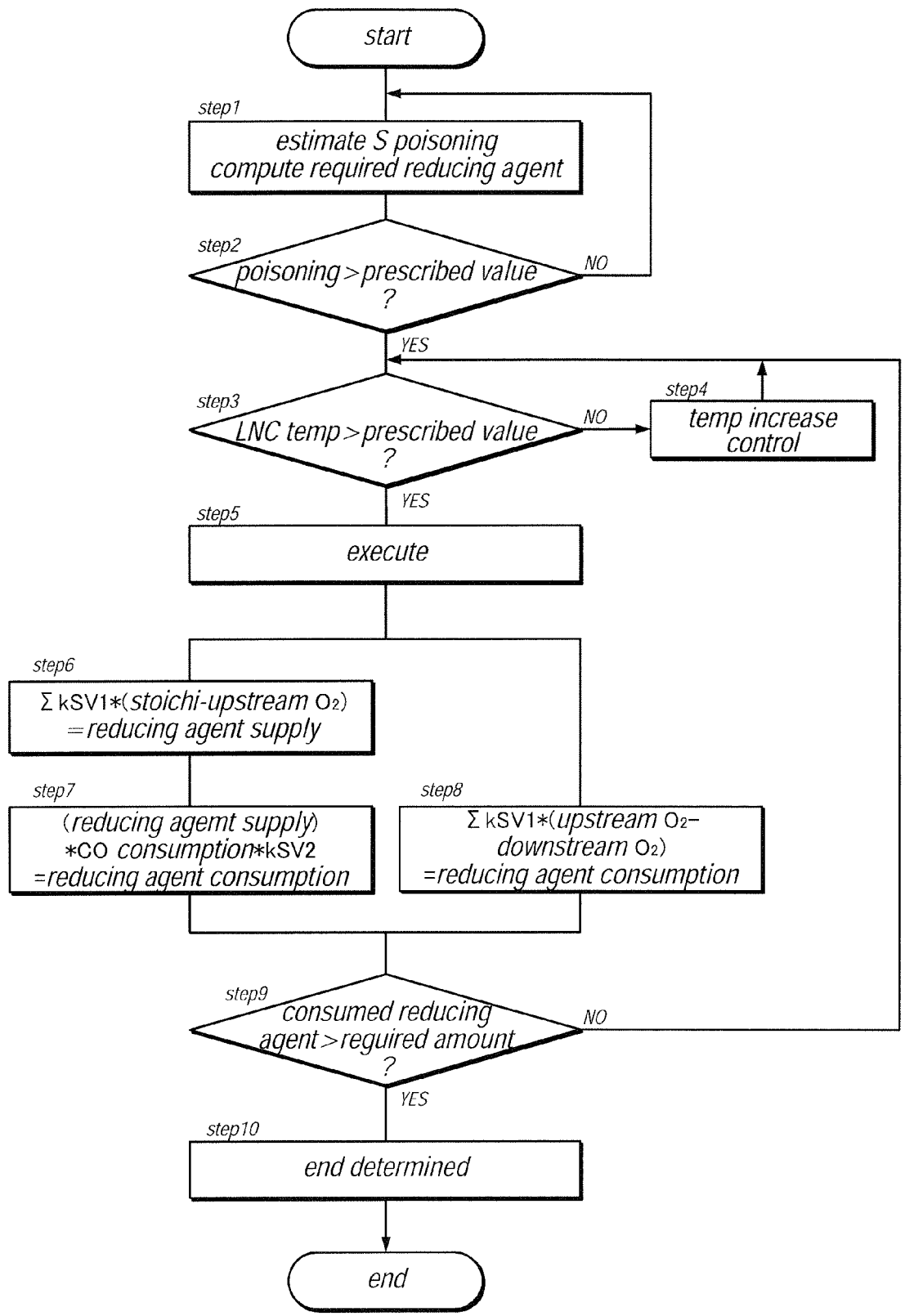
FIG. 3 is a control flowchart of the first embodiment of the present invention.

Thus, the supply of the reducing agent can be accurately determined by multiplying the correcting coefficient kSV1 to the integrated value in step ST6 of FIG. 3, and the change in the consumption of the reducing agent owing to the changes in the contact with the catalyst (reaction probabilities) can be taken into account by multiplying the correction coefficient kSV2 and the CO consumption ratio to the amount of supply of the reducing agent in step 7 of FIG. 3. Also, by multiplying the correction coefficient kSV1 to the integrated value of the difference between the outputs of the upstream and downstream $O_2$ sensors 27U and 27L, the space velocity SV can be taken into account, and the consumption of the reducing agent can be estimated even more accurately. The correction coefficient kSV1 accounts for the influences of the space velocity which represents the flow rate of the exhaust gas on the supply of the reducing agent. Also, by monitoring the difference between the outputs of the upstream $O_2$ sensor 27U and downstream $O_2$ sensor 27L, the consumption of the reducing agent can be directly detected by knowing the air to fuel ratio A/F (oxygen concentration). By such considerations, it is possible to more accurately determine the consumption of the reducing agent in the LNC 9 for each specific operation condition of the vehicle, and to more accurately determine the completion of a sulfur purge.

Thus, because the reducing agent consumption can be adequately accurately evaluated from the integrated value of the difference between the output of the upstream $O_2$ sensor 27U and a stoichiometric ratio by taking into account the CO consumption ratio and SV value, only one $O_2$ sensor is required, and this contributes to the reduction in the manufacturing cost and the saving of the mounting space.

In step 8 of FIG. 3, because the change in the CO consumption ratio is already reflected in the difference between the outputs of the upstream $O_2$ sensor 27U and downstream $O_2$ sensor 27L, it is sufficient to multiply the correction coefficient kSV1 (that accounts for the change in the amount of supply of the reducing agent in dependence on the space velocity SV) to the integrated difference between the outputs of the upstream $O_2$ sensor 27U and downstream $O_2$ sensor 27L.

Thus, because the reducing agent consumption can be adequately accurately evaluated from the integrated value of the difference between the output of the upstream $O_2$ sensor 27U and a stoichiometric ratio by taking into account the CO consumption ratio and SV value, only one $O_2$ sensor is required, and this contributes to the reduction in the manufacturing cost and the saving of the mounting space.

Second Embodiment

FIG. 4 shows a second embodiment of the present invention which is applied to the process of reducing NOx captured in the LNC 9. In the following description of the second embodiment, some of the parts common to the previous embodiment are omitted from the description.

First of all, the amount of NOx captured in the LNC 9 is computed, and the amount of the reducing agent required for reducing the captured NOx is computed in step 11. The captured amount of NOx can be computed by integrating the different between the outputs of the upstream and downstream NOx sensors 28U and 28L. The amount of the reducing agent required for reducing the NOx in the LNC 9 can be readily determined as it is proportional to the amount of the captured NOx.

It is then determined if the captured NOx is greater than a certain threshold value in step 12. The threshold value can be determined by looking up a map for each given temperature of the LNC 9 determined by the output from the LNC temperature sensor 29. The map is prepared so as to reflect the tendency of the NOx reducing rate to diminish as the LNC temperature drops and as the captured amount of NOx increases.

If the captured NOx is determined to be greater than the threshold value in step 12, it is determined if the NOx reducing process enable condition holds in step 13. More specifically, when it is detected that the vehicle is decelerating or idling from the output of the accelerator pedal sensor 26, it is determined that the NOx reducing process enable condition does not hold. If the captured NOx is not greater than the threshold value in step 12 or if the NOx reducing process enable condition does not hold in step 13, the foregoing steps are repeated.

If the NOx reducing process enable condition holds in step 13, an exhaust A/F enriching control is executed in step 14 to reduce the NOx captured in the LNC 9. This exhaust A/F enriching control may consist of increasing the post injection, reducing the intake air flow or other measures similarly as the first embodiment.

In steps 15 to 19, processes similar to those of steps 6 to 10 of the first embodiment are executed. In other words, the termination of the NOx reducing process is determined, instead of the termination of the sulfur purge process. Once the integrated value of the consumption of the reducing agent reaches a required amount of the reducing agent, a NOx reducing process complete signal is produced in step 19.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A control device for an internal combustion engine provided with a NOx catalytic converter in an exhaust passage thereof, comprising:

a control unit that estimates an extent of deposition of undesired substance in the NOx catalytic converter and changes operating parameters of the engine so as to produce a reducing agent in exhaust gas and thereby carry out a removal process of the undesired substance from the NOx catalytic converter;

an upstream detector for detecting a value corresponding to an air fuel ratio in an upstream part of the NOx catalytic converter;

a space velocity detector for detecting a space velocity of exhaust gas that enters the NOx catalytic convert;

means for estimating an amount of supply of a reducing agent to the NOx catalytic converter according to an output of the upstream detector; and first correcting means for correcting an estimated amount of supply of a reducing agent into a corrected amount of supply of a reducing agent which increases with an increase in the space velocity detected by the space velocity detector;

wherein an end of the undesired substance removal process is determined according to the corrected amount of supply of a reducing agent to the NOx catalytic converter.

2. The control device according to claim 1, wherein the control unit determines an end of the undesired substance removal process according to an integrated difference between the output value of the upstream detector and a prescribed reference value.

3. The control device according to claim 1, further comprising a CO consumption ratio detector for detecting a value corresponding to a consumption ratio of CO in the NOx catalytic converter, the detected CO consumption ratio being taken into account when determining an end of the undesired substance removal process.

4. The control device according to claim 1, further comprising a downstream detector for detecting a value corresponding to an air fuel ratio in a downstream part of the NOx catalytic converter, wherein the control unit determines an end of the undesired substance removal process according to a difference between the output values of the upstream and downstream detectors.

5. The control device according to claim 4, wherein the control unit determines an end of a sulfur purge process according to an integrated difference between the output values of the upstream and downstream detectors.

6. The control device according to claim 3, wherein the CO consumption ratio detector comprises a temperature sensor for an upstream end of the NOx catalytic converter.

7. In an internal combustion engine provided with a NOx catalytic converter in an exhaust passage thereof, a method for controlling a removal process of undesired substance in the NOx catalytic converter, comprising:

estimating an extent of deposition of undesired substance in the NOx catalytic converter;

changing operating parameters of the engine from normal values so as to produce a reducing agent from exhaust gas in the exhaust passage and thereby carry out an undesired substance removal process in the NOx catalytic converter;

detecting an upstream air fuel ratio value corresponding to an air fuel ratio in an upstream part of the NOx catalytic converter;

estimating an amount of supply of a reducing agent to the NOx catalytic converter according to an output of the upstream detector;

correcting an estimated amount of supply of a reducing agent into a corrected amount of supply of a reducing agent which increases with an increase in the space velocity detected by the space velocity detector; and determining an end of the undesired substance removal process according to the corrected amount of supply of a reducing agent to the NOx catalytic converter.

8. The control method according to claim 7, wherein the undesired substance removal process is ended when a cumulative value based on the value given by a mathematical function of the detected air fuel ratio value in an upstream part of the NOx catalytic converter has reached a prescribed threshold value.

9. The control method according to claim 8, wherein the cumulative value corresponds to an integrated difference between the upstream air fuel ratio value and a prescribed reference value.

10. The control method according to claim 8, further comprising detecting a downstream air fuel ratio value corresponding to an air fuel ratio in a downstream part of the NOx catalytic converter, and the cumulative value corresponding to an integrated difference between the detected upstream and downstream air fuel ratio values.

11. The control method according to claim 8, further comprising detecting a measure of CO consumption in the NOx catalytic converter, and taking into account the detected measure of CO consumption in determining an end of the undesired substance removal process.

12. The control method according to claim 11, wherein the measure of CO consumption comprises a temperature of the NOx catalytic converter.

13. The control method according to claim 8, further comprising detecting a space velocity of exhaust gas that enters the NOx catalytic converter, and taking into account the detected space velocity in determining an end of the undesired substance removal process.

14. A control device for an internal combustion engine provided with a NOx catalytic converter in an exhaust passage thereof, comprising:

a control unit that estimates an extent of deposition of undesired substance in the NOx catalytic converter and changes operating parameters of the engine so as to produce a reducing agent in exhaust gas and thereby carry out a removal process of the undesired substance from the NOx catalytic converter;

an upstream detector for detecting a value corresponding to an air fuel ratio in an upstream part of the NOx catalytic converter;

a space velocity detector for detecting a space velocity of exhaust gas that enters the NOx catalytic converter;

means for estimating an amount of consumption of a reducing agent in the NOx catalytic converter according to an output of the upstream detector; and second correcting means for correcting an estimated amount of consumption of a reducing agent into a corrected amount of consumption of a reducing agent which decreases with an increase in the space velocity detected by the space velocity detector;

an end of the undesired substance removal process being determined according to the corrected amount of consumption of a reducing agent to the NOx catalytic converter.

15. The control device according to claim 14, wherein the control unit determines an end of the undesired substance removal process according to an integrated difference between the output value of the upstream detector and a prescribed reference value.

16. The control device according to claim 14, further comprising a CO consumption ratio detector for detecting a value corresponding to a consumption ratio of CO in the NOx catalytic converter, the detected CO consumption ratio being taken into account when determining an end of the undesired substance removal process.

17. The control device according to claim 14, further comprising a downstream detector for detecting a value corresponding to an air fuel ratio in a downstream part of the NOx catalytic converter, wherein the control unit determines an end of the undesired substance removal process according to a difference between the output values of the upstream and downstream detectors.

18. The control device according to claim 17, wherein the control unit determines an end of a sulfur purge process according to an integrated difference between the output values of the upstream and downstream detectors.

19. The control device according to claim 16, wherein the CO consumption ratio detector comprises a temperature sensor for an upstream end of the NOx catalytic converter.

* * * * *